United States Patent [19]

Jenkins et al.

[11] Patent Number: 5,484,165
[45] Date of Patent: Jan. 16, 1996

[54] AIR BAG MODULE

[75] Inventors: Jeffrey A. Jenkins, Shelby Township; Scott A. Kelley, Algonac, both of Mich.

[73] Assignee: TRW Vehicle Safety Systems Inc., Lyndhurst, Ohio

[21] Appl. No.: 289,686

[22] Filed: Aug. 12, 1994

[51] Int. Cl.$^6$ .................................................. B60R 21/16
[52] U.S. Cl. .................................. 280/728.2; 280/728.1; 280/732
[58] Field of Search ........................ 280/728 A, 728 R, 280/743 R, 732, 731

[56]  References Cited

U.S. PATENT DOCUMENTS

| | | | |
|---|---|---|---|
| 4,986,569 | 1/1991 | Bruton | 280/732 R |
| 5,058,919 | 10/1991 | Paquette et al. | 280/732 |
| 5,069,480 | 12/1991 | Good | 280/743 R |
| 5,176,400 | 1/1993 | McGuire et al. | 280/728 A |
| 5,184,843 | 2/1993 | Berger et al. | 280/728 A |
| 5,186,492 | 2/1993 | Wright et al. | 280/728 A |
| 5,234,227 | 8/1993 | Weber | 280/732 X |
| 5,263,738 | 11/1993 | Oda et al. | 280/728 A |
| 5,263,739 | 11/1993 | Weber et al. | 280/273 R X |
| 5,354,093 | 10/1994 | Schenck et al. | 280/728 X |

FOREIGN PATENT DOCUMENTS

| | | | |
|---|---|---|---|
| 4201255 | 7/1992 | Japan | 280/728 A |
| 6001189 | 1/1994 | Japan | 280/728 A |

*Primary Examiner*—Margaret A. Focarino
*Assistant Examiner*—Christopher Ellis
*Attorney, Agent, or Firm*—Tarolli, Sundheim & Covell

[57] ABSTRACT

An air bag module (10) includes a housing (12) having a front portion (14) and a rear portion (16). An inflator (18) is connected with the front portion (14) of the housing (12). An air bag (20) is folded and stored in the rear portion (16) of the housing (12). The air bag (20) is secured to a retaining ring (22). Each one of a plurality of fasteners (120–134) interconnects the retaining ring (22), the front portion (14) of the housing (12), and the rear portion (16) of the housing (12).

27 Claims, 3 Drawing Sheets

AIR BAG MODULE

BACKGROUND OF THE INVENTION

1. Technical Field

The present invention relates to a vehicle occupant safety apparatus, and particularly relates to an air bag module including a housing and an air bag retaining ring which are fastened together as part of the air bag module.

2. Description of the Prior Art

A typical air bag module includes an air bag, an inflator for inflating the air bag, and a housing in which the air bag and the inflator are disposed. The housing is connected with a portion of the vehicle such as the vehicle instrument panel and supports the air bag and the inflator in the vehicle. The housing may include a cover which conceals the housing and air bag and is visible to an occupant of the vehicle. In the event of a vehicle collision, the inflator is actuated to direct inflation fluid into the air bag. The air bag inflates into a position to restrain the vehicle occupant from forcefully striking parts of the vehicle.

SUMMARY OF THE INVENTION

The present invention is a vehicle safety apparatus for protecting an occupant of a vehicle. The safety apparatus comprises a housing including a first portion and a second portion. An inflatable vehicle occupant restraint is disposed within the housing. A retaining ring is secured to the inflatable restraint. A plurality of fasteners secure the first portion of the housing to the second portion of the housing. The plurality of fasteners also extend into the retaining ring and secure the retaining ring to the housing. The apparatus includes an inflation fluid source for supplying inflation fluid to the inflatable restraint to inflate the inflatable restraint to restrain a vehicle occupant.

In a preferred embodiment, the inflation fluid source is connected with the first portion of the housing. The first portion of the housing is secured to the vehicle and supports the second portion of the housing on the vehicle. The inflatable restraint is folded and stored in the second portion of the housing. A cover conceals the inflatable restraint and forms a portion of the vehicle instrument panel.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
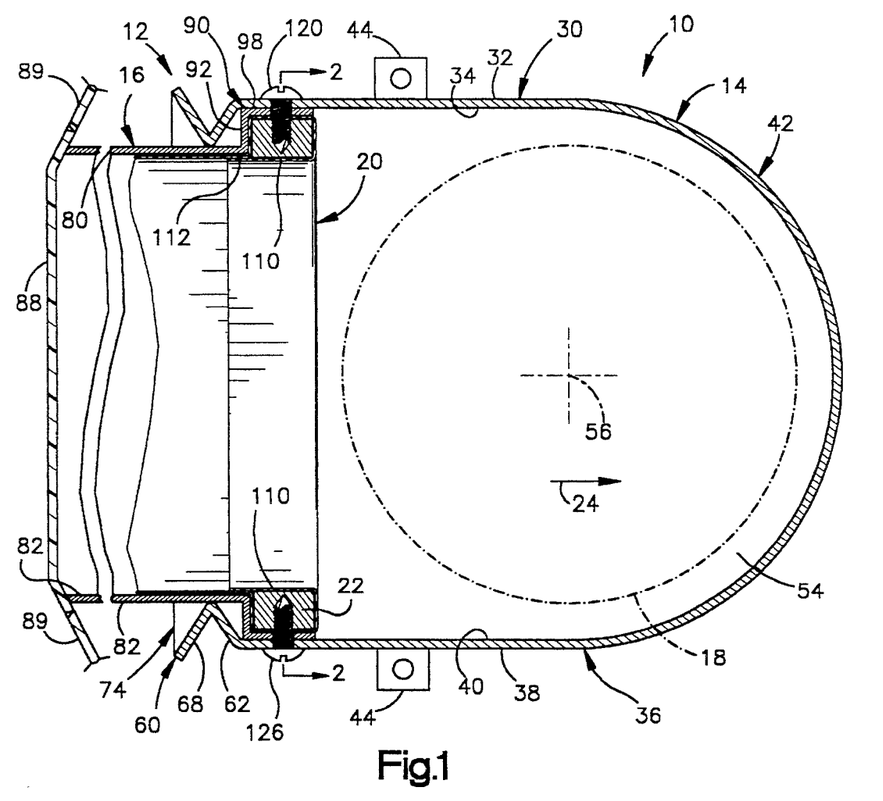
FIG. 1 is a schematic sectional view of a portion of a vehicle safety apparatus embodying the present invention.

The present invention relates to a vehicle safety apparatus and particularly relates to a vehicle safety apparatus including an inflatable vehicle occupant restraint which is inflated to protect an occupant of a vehicle in the event of a vehicle collision. The present invention is applicable to various vehicle safety apparatus constructions. As representative of the present invention, FIG. 1 illustrates a vehicle safety apparatus comprising an air bag module 10.

The module 10 includes a housing 12 having a first portion 14 and a second portion 16. The housing 12 is mounted in a vehicle (not shown) in an orientation with the first portion 14 of the housing closer than the second portion 16 to the front of the vehicle, that is, forward in the vehicle in the direction of forward travel of the vehicle shown by the arrow 24. Accordingly, the housing portion 14 is referred to herein as a front portion of the housing 12 and the housing portion 16 is referred to herein as a rear portion of the housing. The module 10 also includes an inflator (i.e., a source of inflation fluid) indicated schematically at 18, an air bag 20, and an air bag retaining ring 22.

The front portion 14 of the housing 12 is made of sheet metal and includes a generally planar upper wall 30 having an outer side surface 32 and an inner side surface 34. The front portion 14 of the housing 12 also includes a generally planar lower wall 36 spaced from and extending parallel to the upper wall 30. The lower wall 36 has an outer side surface 38 and an inner side surface 40. The inner side surface 40 of the lower wall 36 faces the inner side surface 34 of the upper wall 30. The front portion 14 of the housing 12 further includes a curved central wall 42 extending between and interconnecting the upper wall 30 and the lower wall 36 to form the C-shaped cross-sectional configuration shown in FIG. 1. The front portion 14 of the housing 12 includes mounting flanges or other mounting structure indicated schematically at 44 for securing the front portion of the housing to the vehicle, in any known manner.

Opposed parallel end walls 50 and 52 (FIG. 2) of the front portion 14 of the housing 12 extend perpendicular to the upper and lower walls 30 and 36 at opposite ends of the C-shaped configuration. The housing walls 30, 36, 42, 50 and 52 define a chamber 54 in the front portion 14 of the housing 12. An axis 56 of the module 10 extends longitudinally between the end walls 50 and 52. In the illustrated embodiment, the axis 56 is disposed parallel to and equidistant between the upper and lower walls 30 and 36.

The inflator 18 is disposed in the chamber 54 in the front portion 14 of the housing 12 adjacent to the central wall 42.

The inflator 18 is a known inflator having an elongate cylindrical shape with a longitudinal axis which is coincident with the axis 56. Opposite end portions 58 of the inflator 18 (FIG. 2) are connected with the end walls 50 and 52, in a manner not shown, and support the inflator on the front portion 14 of the housing 12. The inflator 18 has one or more fluid outlets (not shown) through which inflation fluid is directed, upon actuation of the inflator, into the chamber 54 to inflate the air bag 20. The inflator could be mounted in any other suitable manner in the housing 12.

The front portion 14 of the housing 12 includes a retainer portion 60 (FIGS. 1 and 1A) having a generally V-shaped cross-sectional configuration. The retainer portion 60 is the rearwardmost part of the front portion 14 of the housing 12 and extends around the entire periphery (as viewed in FIG. 2) of the front portion of the housing. A first wall 62 of the retainer portion 60 extends inward and rearward from the walls 30, 36, 50 and 52. A second wall 68 of the retainer portion 60 extends outward and rearward from the first wall 62. The rearward edge of the second wall 68 defines an opening 74 into the front portion 14 of the housing 12 opposite the central wall 42. One or more slots (not shown) are formed in the front portion 14 of the housing 12 to allow the retainer portion 60 to be enlarged outward temporarily and receive the rear portion 16 of the housing.

The rear portion 16 of the housing 12 is also made from sheet metal and has a rectangular box-shaped configuration including parallel upper and lower walls 80 and 82. Opposed parallel end walls 84 and 86 (FIG. 2) of the rear portion 16 of the housing 12 extend perpendicular to the upper and lower walls 80 and 82 at opposite ends of the box-shaped configuration. The rear portion 16 of the housing 12 includes a cover 88 which is preferably made of plastic. The cover 88 conceals the air bag 20 and closes the rear portion 16 of the housing 12. The cover 88 is preferably configured as and forms a portion of an instrument panel 89 of the vehicle, which portion is visible to a vehicle occupant.

The rear portion 16 of the housing 12 (FIGS. 1 and 1A) includes a retainer portion 90 which has an L-shaped cross-sectional configuration. The retainer portion 90 is the forwardmost part of the rear portion 16 of the housing 12 and extends around the entire periphery (as viewed in FIG. 2) of the rear portion of the housing. The retainer portion 90 includes a first wall 92 which extends generally perpendicular to the walls 80–86 of the rear portion 16 of the housing 12. A second wall 98 of the retainer portion 90 extends generally perpendicular to the first wall 92 and generally parallel to the walls 80–86.

The retaining ring 22 (FIG. 2) is a one-piece metal casting and is generally rectangular in overall configuration. The retaining ring 22 has a rectangular cross-sectional configuration which is complementary to the configuration of the adjoining first wall 92 and second wall 98 of the rear portion 16 of the housing 12. The retaining ring 22 is closely fitted within the L-shaped cross-sectional configuration of the retainer portion 90 (FIGS. 1 and 1A) of the rear portion 16 of the housing 12.

Figure 1A:
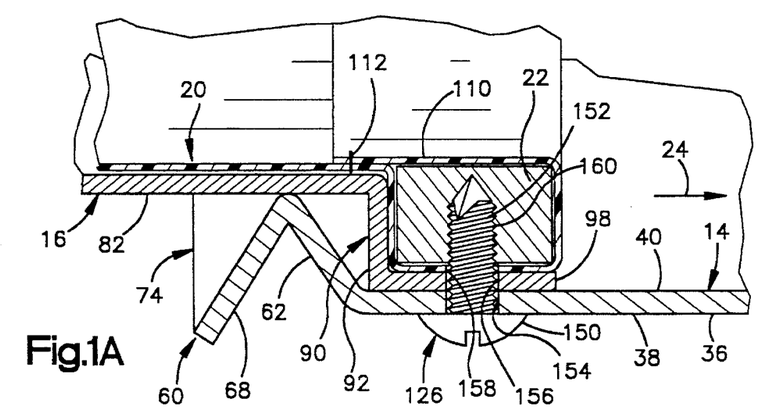
FIG. 1A is an enlarged view of a portion of FIG. 1.
Figure 2:
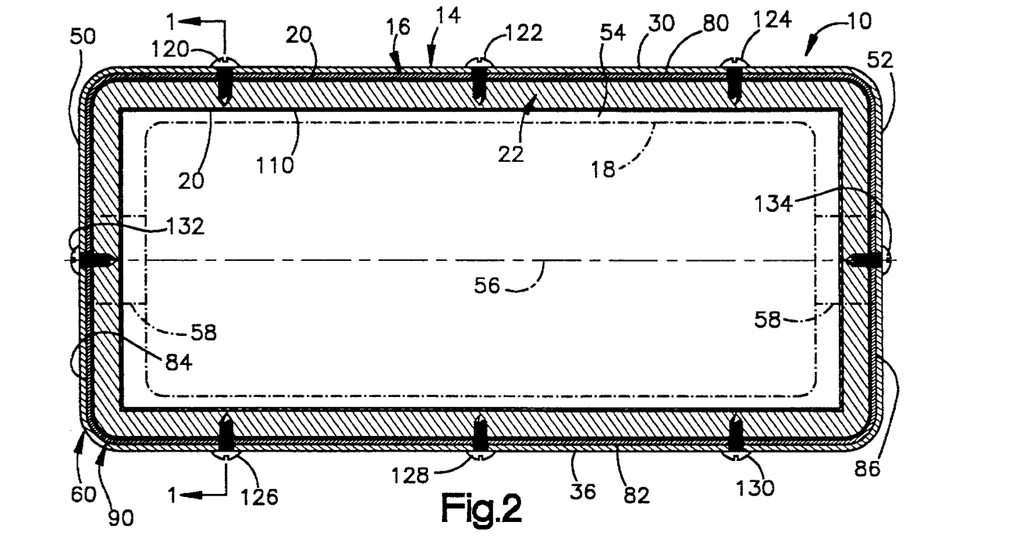
FIG. 2 is a sectional view of the vehicle safety apparatus of FIG. 1 taken along line 2—2 of FIG. 1.
Figure 3:
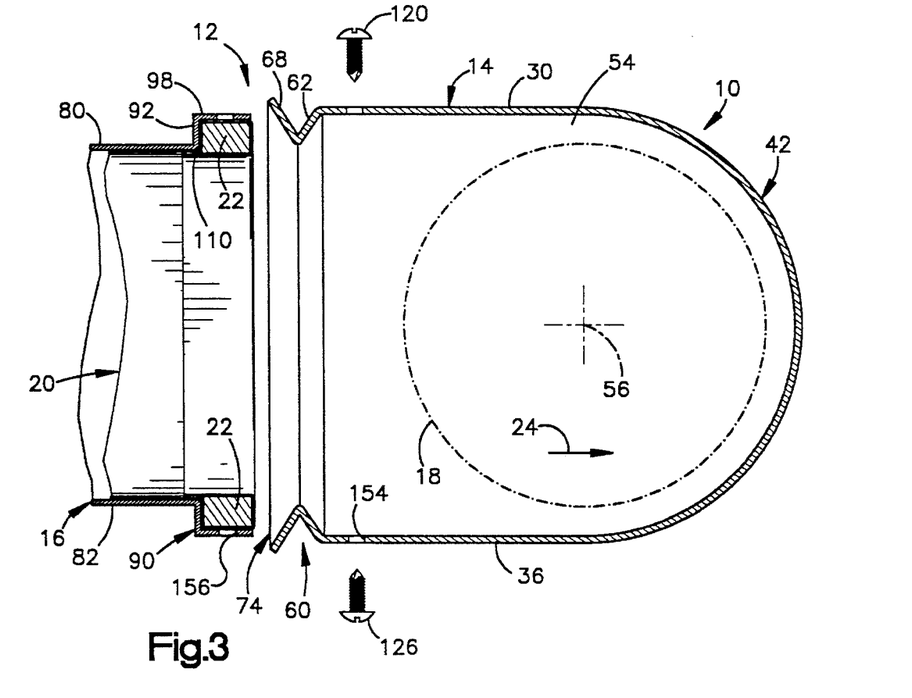
FIG. 3 is an exploded view similar to FIG. 1.

The air bag 20, only portions of which are illustrated in FIGS. 1–3, is folded and stored in a known manner in the rear portion 16 of the housing 12. The air bag 20 is made from a fabric material, preferably woven nylon. A portion 110 of the air bag 20 is wrapped around the retaining ring 22 and sewn at a stitching line indicated schematically at 112 (FIG. 1A).

To assemble the air bag module 10, the air bag 20 and the retaining ring 22 are positioned adjacent to the rear portion 16 of the housing 12, as shown in FIG. 3. The front portion 14 of the housing 12 and the rear portion 16 of the housing are moved toward each other. The retainer portion 90 of the rear portion 16 of the housing 12 moves through the opening 74 defined by the wall 68 of the retainer portion 60 of the front portion 14 of the housing. The front portion 14 and the rear portion 16 of the housing 12 engage each other. The slots (not shown) in the retainer portion 60 of the front portion 14 of the housing 12 allow the retainer portion 60 to be enlarged outward temporarily over the retainer portion 90 of the rear portion 14 of the housing as the housing portions continue to move relative to each other into the assembled condition shown in FIG. 1. The resilience of the material of the front portion 14 of the housing 12 then pulls the retainer portion 60 inward over and around the retainer portion 90 of the rear portion 16 of the housing, the retaining ring 22, and the air bag 20.

A plurality of identical fasteners connect the assembled housing 12, air bag 20, and retaining ring 22. In the illustrated embodiment, the fasteners are self-tapping screws which form threads in untapped openings in the retaining ring 22. Other types of fasteners may be used, if desired. Three screws 120, 122, and 124 (FIG. 2) connect the retaining ring 22 with the upper wall 30 of the front portion 14 of the housing 12 and with the upper wall 80 of the rear portion 16 of the housing. Three screws 126, 128 and 130 connect the retaining ring 22 with the lower wall 36 of the front portion 14 of the housing 12 and with the lower wall 82 of the rear portion 16 of the housing. A screw 132 connects the retaining ring 22 with the end wall 50 of the front portion 14 of the housing 12 and with the end wall 84 of the rear portion 16 of the housing. At the opposite end of the vehicle safety apparatus 10, a screw 134 connects the retaining ring 22 with the end wall 52 of the front portion 14 of the housing 12 and with the end wall 86 of the rear portion 16 of the housing.

The screw 120, which is exemplary of the screws 120–134, has a head portion 150 (FIG. 1A) and a threaded shank 152. The head portion 150 of the screw 120 engages the outer side surface 38 of the lower wall 36 of the front portion 14 of the housing 12. The shank 152 of the screw 120 extends through an opening 154 in the lower wall 36 of the front portion 14 of the housing 12. The shank 152 also extends through an opening 156 in the wall 98 of the rear portion 16 of the housing 12. The shank 152 further extends through an opening 158 in the air bag 20 and is screwed into a drilled, untapped opening 160 in the retaining ring 22. The screw 120 forms threads in the opening 160 in the retaining ring 22. The screw 120 does not extend completely through the material of the retaining ring 22; that is, the point of the screw 120 does not project from the retaining ring.

In a similar manner, the other fasteners 122–134 are screwed through aligned openings in the front and rear portions 14 and 16 of the housing 12 and in the air bag 20, into openings in the retaining ring 22. The fasteners 120–134 thus connect the two portions 14 and 16 of the housing 12 and simultaneously secure the retaining ring 22 and the air bag to the housing. The inwardly extending first wall 92 of the rear portion 16 of the housing 12 assists in blocking movement of the retaining ring 22 in a direction away from the inflator 18, that is, to the left as viewed in FIG. 1.

Each vehicle safety apparatus 10 which is constructed in accordance with the present invention is specifically configured for installation and use in a particular vehicle. That is, the air bag 20 is folded and stored in a specific overall configuration, and the cover 88 has a specific configuration as a part of the instrument panel 89 of that particular vehicle.

It is contemplated that air bag modules 10 which are constructed in accordance with the present invention may be provided for installation in a plurality of different vehicles. It is therefore desirable to provide different air bag modules 10 having a plurality of different overall configurations, most likely involving changes to the rear portion 16 of the housing 12. Because the housing 12 of the air bag module 10 includes separate front and rear portions 14 and 16, any selected one of a plurality of differently configured rear portions of the housing can alternatively be assembled with a common front portion. The rear portion 16 of the housing 12, which encloses the folded air bag 20 and which includes the cover 88, can have a particular configuration as dictated by the shape of the vehicle instrument panel so long as the retainer portion 90 of the rear portion of the housing engages properly with the retainer portion 60 of the front portion 14 of the housing.

Figure 4:
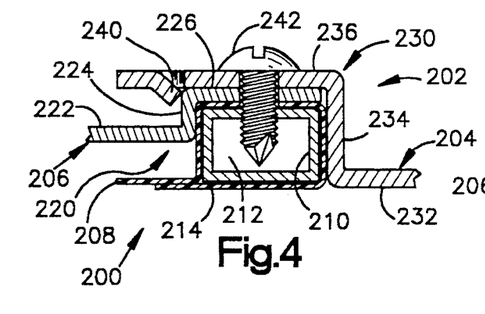
FIG. 4 is a view similar to FIG. 1A illustrating a portion of a vehicle safety apparatus constructed in accordance with a second embodiment of the present invention.

FIG. 4 illustrates a portion of an air bag module 200 which is constructed in accordance with a second embodiment of the present invention. The air bag module 200 is generally similar to the air bag module 10 (FIGS. 1–3) illustrated as the first embodiment of the present invention. Portions of the air bag module 200 which are not shown in FIG. 4 may be the same as in the air bag module 10 (FIGS. 1–3).

The air bag module 200 (FIG. 4) includes a housing 202 which has a front portion 204 and a rear portion 206. The air bag module 200 also includes an air bag 208 which is connected with a retaining ring 210. The retaining ring 210 is a tubular metal member having a rectangular cross-sectional configuration defining a central cavity 212. A tubular attachment portion 214 of the air bag 208 is wrapped around the retaining ring 210 and sewn to secure the air bag to the retaining ring.

The air bag 208 and the retaining ring 210 are closely fitted within a retainer portion 220 of the rear portion 206 of the housing 202. The retainer portion 220 extends outward and forward from a wall portion 222 of the rear portion 206 of the housing 202. Because FIG. 4 is illustrative of the configuration of the air bag module 200 at all fastener locations around the periphery of the module, the wall portion 222 can be a portion of any one of the upper and lower walls and the end walls of the rear portion 206 of the housing 202. A first wall 224 of the retainer portion 220 extends outward from and generally perpendicular to the wall portion 222. A second wall 226 of the retainer portion 220 extends forward from the first wall 224 in a direction generally parallel to the wall portion 222.

The front portion 204 of the housing 202 includes a retainer portion 230 which extends outward and rearward from a wall portion 232. The wall portion 232 is illustrated as and can be a portion of any one of the upper and lower walls and the end walls of the front portion 204 of the housing 202. The retainer portion 230 includes a first wall 234 which extends outward from and generally perpendicular to the wall portion 232. A second wall 236 extends rearward from the first wall 234 in a direction generally parallel to the wall portion 232.

A tab 240 on the front portion 204 of the housing 202 projects inwardly from the second wall 236 and engages behind the first wall 224 of the rear portion 206 of the housing. The retainer portion 220 of the rear portion 206 of the housing 202 is captured within the retainer portion 230 of the front portion 204 of the housing 202, between the tab 240 and the first wall 234. A fastener 242, which is illustrated as a self-tapping sheet metal screw, extends through aligned openings in the front and rear portions 204 and 206 of the housing 202, the air bag 208, and the retaining ring 210. The fastener 242 extends into the central cavity 212 of the retaining ring 210. The fastener 242 connects the two portions 204 and 206 of the housing 202 and simultaneously secures the retaining ring 210 to the two portions of the housing.

Although not illustrated, the retainer portions 220 and 230 of the housing 202, as well as the retaining ring 210, extend around the entire periphery of the air bag module 200. A plurality of tabs which are identical to the tab 240 are formed on the front portion 204 of the housing 202. The tabs 240 engage the rear portion 206 of the housing 202 at spaced locations around the periphery of the air bag module 200. A plurality of fasteners which are identical to the fastener 242 are provided at spaced locations to connect the two portions 204 and 206 of the housing 202 with the retaining ring 210.

Figure 5:
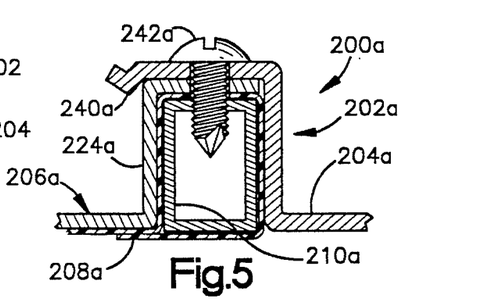
FIG. 5 is a view similar to FIG. 1A illustrating a portion of a vehicle safety apparatus constructed in accordance with a third embodiment of the present invention.

FIG. 5 illustrates a portion of an air bag module 200a which is constructed in accordance with a third embodiment of the present invention. The air bag module 200a is generally similar to the air bag module 200 (FIG. 4), and similar parts are given in FIG. 5 the same reference numeral with the suffix "a". The portions of the air bag module 200a which are not shown in FIG. 5 may be the same as in the air bag module 10 (FIGS. 1–3).

The front portion 204a (FIG. 5) of the housing 202a of the air bag module 200a includes an inwardly bent edge portion 240a, rather than a tab 240 (FIG. 4) as in the air bag module 200. The edge portion 240a (FIG. 5) extends around the entire periphery of the front portion 204a of the housing 202a of the air bag module 200a. The edge portion 240a blocks separation of the housing portions 204a and 206a around the entire periphery of the assembled module 200a. The lateral cross-sectional extent (from top to bottom as viewed in FIG. 5) of the retaining ring 210a is substantially the same as the lateral cross-sectional extent of the first wall 224a of the rear housing portion 206a. Thus, the wall 224a, across substantially its entire lateral cross-sectional extent, blocks movement of the retaining ring 210a.

Figure 6:
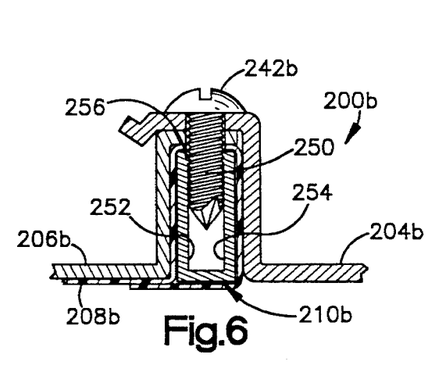
FIG. 6 is a view similar to FIG. 1A illustrating a portion of a vehicle safety apparatus constructed in accordance with a fourth embodiment of the present invention.

FIG. 6 illustrates a portion of an air bag module 200b which is constructed in accordance with a fourth embodiment of the present invention. The air bag module 200b is generally similar to the air bag module 200a (FIG. 5), and similar parts are given in FIG. 6 the same reference numeral with the suffix "b" instead of the suffix "a". The portions of the air bag module 200b which are not shown in FIG. 6 may be the same as in the air bag module 10 (FIGS. 1–3).

The retaining ring 210b (FIG. 6) has a proportionately shorter front to rear cross-sectional extent (from right to left as viewed in FIG. 6) than the retaining ring 210a (FIG. 5). Thus, a threaded shank portion 250 (FIG. 6) of the fastener 242b engages side walls 252 and 254 of the retaining ring 210b as well as the outer wall 256 of the retaining ring.

Figure 7:
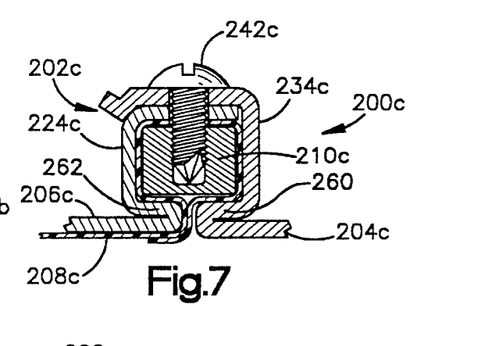
FIG. 7 is a view similar to FIG. 1A illustrating a portion of a vehicle safety apparatus constructed in accordance with a fifth embodiment of the present invention.

FIG. 7 illustrates a portion of an air bag module 200c which is constructed in accordance with a fifth embodiment of the present invention. The air bag module 200c is generally similar to the air bag module 200b (FIG. 6), and similar parts are given in FIG. 7 the same reference numeral with the suffix "c" instead of the suffix "b". The portions of the air bag module 200c which are not shown in FIG. 7 may be the same as in the air bag module 10 (FIGS. 1–3).

The first wall 234c of the front portion 204c of the housing 202c has substantially the same cross-sectional lateral extent (from top to bottom as viewed in FIG. 7) as the retaining ring 210c. The front portion 204c of the housing 202 is folded over at 260 to wrap partially around the inside of the retaining ring 210c. The rear portion 206c of the housing 202c has a first wall 224c with substantially the same lateral extent as the retaining ring 210c. The rear portion 206c of the housing 202c is folded over at 262 to wrap partially around the inside of the retaining ring 210c. The portions 260 and 262 of the housing 202c which wrap around the retaining ring 210c assist in blocking inward and rearward movement of the retaining ring 210c.

Figure 8:
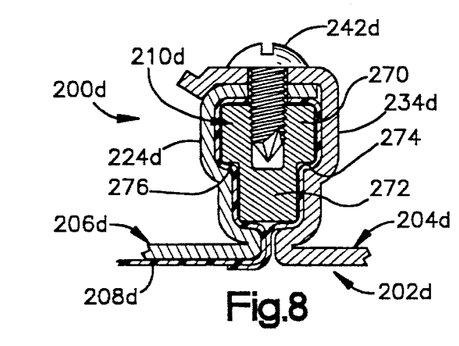
FIG. 8 is a view similar to FIG. 1A illustrating a portion of a vehicle safety apparatus constructed in accordance with a sixth embodiment of the present invention.

FIG. 8 illustrates a portion of an air bag module 200d which is constructed in accordance with a sixth embodiment of the present invention. The air bag module 200d is generally similar to the air bag module 200c (FIG. 7), and similar parts are given in FIG. 8 the same reference numeral with the suffix "d" instead of the suffix "c". The portions of the air bag module 200d which are not shown in FIG. 8 may be the same as in the air bag module 10 (FIGS. 1–3).

The retaining ring 210d (FIG. 8) has a stepped cross-sectional configuration. An outer portion 270 of the retaining ring 210d has a relatively wide front to back cross-sectional extent (from right to left as viewed in FIG. 8). An adjacent inner portion 272 of the retaining ring 210d has a relatively narrow front to back cross-sectional extent, and thus defines front and rear shoulders 274 and 276 where it meets the outer portion 270. The walls 224d and 234d of the housing 202d also have a stepped configuration, so as to be fitted closely around the retaining ring 210d. The apposition of the walls 224d and 234d to the shoulders 274 and 276 assists in blocking inward movement of the retaining ring 210d relative to the housing 202d.

Figure 9:
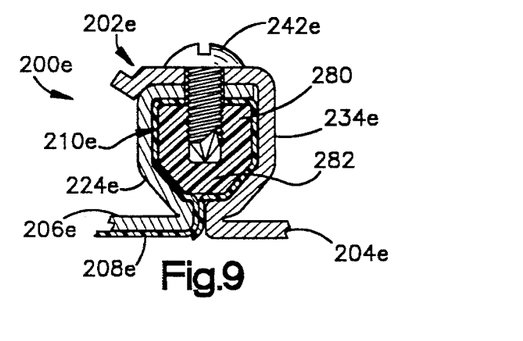
FIG. 9 is a view similar to FIG. 1A illustrating a portion of a vehicle safety apparatus constructed in accordance with a seventh embodiment of the present invention.

FIG. 9 illustrates a portion of an air bag module 200e which is constructed in accordance with a seventh embodiment of the present invention. The air bag module 200e is generally similar to the air bag module 200d (FIG. 8), and similar parts are given in FIG. 9 the same reference numeral with the suffix "e" instead of the suffix "d". The portions of the air bag module 200e which are not shown in FIG. 9 may be the same as in the air bag module 10 (FIGS. 1–3).

The retaining ring 210e (FIG. 9) has a six-sided cross-sectional configuration. The retaining ring 210e is solid rather than tubular and is made from plastic or from a composite material, rather than from metal. An outer portion 280 of the retaining ring 210e has a relatively wide front to back cross-sectional extent (from right to left as viewed in FIG. 9). An inner portion 282 of the retaining ring 210e has side surfaces that taper toward each other so that the innermost front to back extent of the inner portion is less than the front to back extent of the outer portion 280. The first walls 224e and 234e of the housing 202e are configured so as to be fitted closely around the retaining ring 210e. The apposition of the walls 224e and 234e to the inner portion 282 of the retaining ring 210e assists in blocking movement of the retaining ring relative to the housing 202e.

Figure 10:
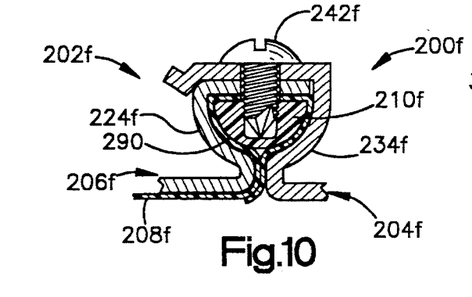
FIG. 10 is a view similar to FIG. 1A illustrating a portion of a vehicle safety apparatus constructed in accordance with an eighth embodiment of the present invention.

FIG. 10 illustrates a portion of an air bag module 200f which is constructed in accordance with a eighth embodiment of the present invention. The air bag module 200f is generally similar to the air bag module 200e (FIG. 9), and similar parts are given in FIG. 10 the same reference numeral with the suffix "f" instead of the suffix "e". The portions of the air bag module 200f which are not shown in FIG. 10 may be the same as in the air bag module 10 (FIGS. 1–3).

The retaining ring 210f (FIG. 10) has a generally semi-circular cross-sectional configuration partially defined by a curved inner surface 290. The first walls 224f and 234f of the housing 202f are similarly curved, so as to be fitted closely around the retaining ring 210f. The apposition of the walls 224f and 234f to the curved inner surface 290 of the retaining ring 210f assists in blocking movement of the retaining ring relative to the housing 202f.

Figure 11:
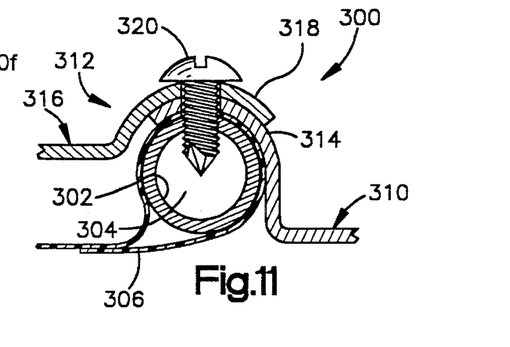
FIG. 11 is a view similar to FIG. 1A illustrating a portion of a vehicle safety apparatus constructed in accordance with a ninth embodiment of the present invention.

FIG. 11 illustrates a portion of an air bag module 300 which is constructed in accordance with a ninth embodiment of the present invention. The air bag module 300 is generally similar to the air bag module 10 (FIG. 1). The portions of the air bag module 300 which are not shown in FIG. 10 may be the same as in the air bag module 10 (FIGS. 1–3).

The air bag module 300 (FIG. 11) includes a tubular metal retaining ring 302. The retaining ring 302 has a cylindrical cross-sectional configuration defining a central cavity 304. A tubular attachment portion of an air bag 306 is wrapped around the retaining ring 302 and sewn to secure the air bag to the retaining ring.

It is contemplated that any embodiment of the invention could include a rear housing portion which extends around a front portion. In the air bag module 300, the rear portion of the housing extends around the front portion, in contrast to the air bag modules illustrated in FIGS. 1–10. Thus, a front portion 310 of a housing 312 has a curved rear wall portion 314 which wraps around the curved outer surface of the retaining ring 302. A rear portion 316 of the housing 312 has a curved front wall portion 318 which wraps around the curved rear wall portion 314 of the front portion 310 of the housing. A fastener 320 extends through aligned openings in the front and rear portions 310 and 316 of the housing 312, the air bag 306, and the retaining ring 302. The fastener 320 extends into the central cavity 304 of the retaining ring 302. The fastener 320 connects the two portions 310 and 316 of the housing 312 and simultaneously secures the retaining ring 302 to the two portions of the housing.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle safety apparatus for protecting an occupant of a vehicle, comprising:

a housing including a first portion and a second portion;

an inflatable vehicle occupant restraint disposed within said housing;

a retaining ring connected with said inflatable restraint for securing said inflatable restraint to said housing;

an inflation fluid source connected with said housing for supplying inflation fluid to said inflatable restraint;

a plurality of fasteners each interconnecting said first portion of said housing and said second portion of said housing and said retaining ring;

said first and second portions of said housing have interengaging first and second retainer portions, one of said retainer portions being disposed outward of and overlying the other one of said retainer portions; and means for blocking movement of said second portion of said housing relative to said first portion of said housing, said means for blocking comprising inwardly extending wall portions of said first retainer portion of said first portion of said housing disposed on opposite sides of said second retainer portion of said second portion of said housing.

2. An apparatus as set forth in claim 1 wherein said inwardly extending wall portions comprise a first wall of said first retainer portion and a tab on said first retainer portion which projects inwardly and engages behind said second retainer portion of said second portion of said housing, said second retainer portion of said housing being captured within said first retainer portion of said housing between said tab and said first wall.

3. An apparatus as set forth in claim 1 wherein said inwardly extending wall portions comprise an inwardly bent edge portion of said first retainer portion which extends around the periphery of said first portion of said housing and which blocks separation of said first and second housing portions around the periphery of said safety apparatus.

4. An apparatus as set forth in claim 1 wherein said first retainer portion comprises a first wall which has substantially the same cross-sectional lateral extent as said retaining ring, said first portion of said housing being folded over to wrap partially around the inside of said retaining ring, said second retainer portion having a first wall with substantially the same lateral extent as said retaining ring, said second portion of said housing being folded over to wrap partially around the inside of said retaining ring.

5. An apparatus as set forth in claim 1 wherein said retaining ring has a stepped cross-sectional configuration including an outer portion which has a relatively wide front to back cross-sectional extent and an adjacent inner portion which has a relatively narrow front to back cross-sectional extent, said retainer portions of said housing having a stepped configuration so as to be fitted closely around said retaining ring to block inward movement of said retaining ring relative to said housing.

6. A vehicle safety apparatus for protecting an occupant of a vehicle, comprising:

a housing including a first portion and a second portion;

an inflatable vehicle occupant restraint disposed at least partially in said second portion of said housing;

an inflation fluid source connected with and disposed in said first portion of said housing for supplying inflation fluid to the inflatable vehicle occupant restraint;

a retaining ring connected with said inflatable restraint for securing said inflatable restraint to said housing;

a plurality of fasteners each interconnecting said first portion of said housing with said second portion of said housing and with said retaining ring;

said first and second portions of said housing having interengaging first and second retainer portions, said fasteners extending through at least one of said retainer portions, at least one of said retainer portions having a cross-sectional configuration complementary to the cross-sectional configuration of said retaining ring; and means for blocking movement of said second portion of said housing in a direction away from said inflation fluid source, comprising at least one inwardly extending wall portion of said retainer portion of said first portion of said housing.

7. An apparatus as set forth in claim 6 wherein said means for blocking movement comprises a first wall of said first retainer portion and a tab on said first retainer portion which projects inwardly and engages behind said second retainer portion of said second portion of said housing, said second retainer portion of said housing being captured within said first retainer portion of said housing between said tab and said first wall.

8. An apparatus as set forth in claim 6 wherein said inwardly extending wall portion comprises an inwardly bent edge portion of said first retainer portion which extends around the periphery of said first portion of said housing and which blocks separation of said first and second housing portions around the periphery of said safety apparatus.

9. An apparatus as set forth in claim 6 wherein said first retainer portion comprises a first wall which has substantially the same cross-sectional lateral extent as said retaining ring, said first portion of said housing being folded over to wrap partially around the inside of said retaining ring, said second retainer portion having a first wall with substantially the same lateral extent as said retaining ring, said second portion of said housing being folded over to wrap partially around the inside of said retaining ring.

10. An apparatus as set forth in claim 6 wherein said retaining ring has a stepped cross-sectional configuration including an outer portion which has a relatively wide front to back cross-sectional extent and an adjacent inner portion which has a relatively narrow front to back cross-sectional extent, said retainer portions of said housing having a stepped configuration so as to be fitted closely around said retaining ring to block inward movement of said retaining ring relative to said housing.

11. A vehicle safety apparatus for protecting an occupant of a vehicle, comprising:

a housing including a first portion and a second portion;

an inflatable vehicle occupant restraint disposed at least partially in said second portion of said housing;

an inflation fluid source connected with and disposed in said first portion of said housing for supplying inflation fluid to the inflatable vehicle occupant restraint;

a retaining ring connected with said inflatable restraint for securing said inflatable restraint to said housing; and a plurality of fasteners each interconnecting said first portion of said housing with said second portion of said housing and with said retaining ring;

said first and second portions of said housing having interengaging first and second retainer portions, said fasteners extending through at least one of said retainer portions, at least one of said retainer portions having a cross-sectional configuration complementary to the cross-sectional configuration of said retaining ring;

wherein said retainer portion of said first portion of said housing includes inwardly extending wall portions disposed respectively on opposite sides of said retainer portion of said second portion of said housing to block movement of said second portion of said housing relative to said first portion of said housing.

12. An apparatus as set forth in claim 11 wherein said inwardly extending wall portion comprises a first wall of said first retainer portion and a tab on said first retainer portion which projects inwardly and engages behind said second retainer portion of said second portion of said housing, said second retainer portion of said housing being captured within said first retainer portion of said housing between said tab and said first wall.

13. An apparatus as set forth in claim 11 wherein said inwardly extending wall portion comprises an inwardly bent edge portion of said first retainer portion which extends around the periphery of said first portion of said housing and which blocks separation of said first and second housing portions around the periphery of said safety apparatus.

14. An apparatus as set forth in claim 11 wherein said first retainer portion comprises a first wall which has substantially the same cross-sectional lateral extent as said retaining ring, said first portion of said housing being folded over to wrap partially around the inside of said retaining ring, said second retainer portion having a first wall with substantially the same lateral extent as said retaining ring, said second portion of said housing being folded over to wrap partially around the inside of said retaining ring.

15. An apparatus as set forth in claim 11 wherein said retaining ring has a stepped cross-sectional configuration including an outer portion which has a relatively wide front to back cross-sectional extent and an adjacent inner portion which has a relatively narrow front to back cross-sectional extent, said retainer portions of said housing having a stepped configuration so as to be fitted closely around said retaining ring to block inward movement of said retaining ring relative to said housing.

16. A vehicle safety apparatus for protecting an occupant of a vehicle, comprising:

a housing including a first portion and a second portion which is separable from and movable relative to said first portion;

an inflatable vehicle occupant restraint disposed within said housing;

a retaining ring connected with said inflatable restraint for securing said inflatable restraint to said housing;

an inflation fluid source connected with said housing for supplying inflation fluid to said inflatable restraint; and a plurality of fasteners each interconnecting said first portion of said housing and said second portion of said housing and said retaining ring;

said first and second portions of said housing having respective interengaging first and second retainer portions, said first retainer portion of said first portion of said housing being disposed outward of and overlying said second retainer portion of said second portion of said housing;

said first retainer portion defining an opening into said first portion of said housing through which said second retainer portion and said retaining ring are movable to an engaged position inside said first portion of said housing;

said safety apparatus having an assembled condition in which said second retainer portion and said retaining ring are in the engaged position inside said first portion of said housing, when said safety apparatus is in the assembled condition said first retainer portion being in a first condition and said opening having a relatively small area, for blocking movement of said second retainer portion and said retaining ring from the engaged position in a first direction through said opening and out of said first portion of said housing;

said safety apparatus having a second condition in which said first retainer portion is in a second condition and said opening has a relatively large area, for enabling movement of said second retainer portion and said retaining ring from a location outside of said first portion of said housing in a second direction opposite to the first direction through said opening and into the engaged position inside said first portion of said housing.

17. An apparatus as set forth in claim 16 wherein said first retainer portion comprises at least one resilient wall portion which is resiliently movable between first and second positions to allow said first retainer portion to be enlarged temporarily to receive said second retainer portion and said retaining ring through said opening and into said first portion of said housing, the resilience of said at least one wall portion pulling said first retainer portion inward over and around said second retainer portion and said retaining ring when said second retainer portion and said retaining ring are in the engaged position inside said first portion of said housing.

18. An apparatus as set forth in claim 16 wherein said inflation fluid source is connected with and is disposed inside said first portion of said housing, said inflatable restraint being connected with and disposed inside said second portion of said housing.

19. An apparatus as set forth in claim 16 wherein said fasteners extend through openings in said first portion of said housing and through openings in said second portion of said housing and into openings in said retaining ring.

20. An apparatus as set forth in claim 19 wherein said fasteners extend into said openings in said retaining ring in a direction transverse to said first direction.

21. An apparatus as set forth in claim 16 wherein said first retainer portion extends around the periphery of said first portion of said housing and has a generally V-shaped cross-sectional configuration including a first inwardly extending wall and a second wall which extends outward from said first wall, said second wall having an edge portion which defines said opening into said first portion of said housing.

22. An apparatus as set forth in claim 16 wherein said retaining ring has a plurality of internal surfaces which define a plurality of openings in said retaining ring, each one of said internal surfaces defining a respective internal thread convolution which is disposed within said retaining ring and which forms an outer periphery of a respective opening in said retaining ring; and said fasteners are screws each having a threaded shank with an external thread convolution in engagement with a respective one of said internal thread convolutions on said retaining ring, said plurality of screws interconnecting said first portion of said housing and said second portion of said housing and said retaining ring.

23. A vehicle safety apparatus for protecting an occupant of a vehicle, comprising:

a housing including a first portion and a second portion;

an inflatable vehicle occupant restraint disposed within said housing;

an inflation fluid source connected with said housing for supplying inflation fluid to said inflatable restraint;

a retaining ring connected with said inflatable restraint for securing said inflatable restraint to said housing;

said retaining ring having a plurality of internal surfaces which define a plurality of openings in said retaining ring, each one of said internal surfaces defining a respective internal thread convolution which is disposed within said retaining ring and which forms an outer periphery of a respective opening in said retaining ring; and a plurality of screws, each one of said screws having a threaded shank with an external thread convolution in engagement with a respective one of said internal thread convolutions on said retaining ring, said plurality of screws interconnecting said first portion of said housing and said second portion of said housing and said retaining ring.

24. An apparatus as set forth in claim 23 wherein each one of said shanks extends through an opening in said first housing portion and through an opening in said second housing portion and is screwed into a respective opening in said retaining ring.

25. An apparatus as set forth in claim 24 wherein said screws are self-tapping screws which form said thread convolutions in said retaining ring when said screws are inserted into said openings in said retaining ring.

26. An apparatus as set forth in claim 23 wherein each one of said screws has a head portion and has an opposite leading end portion which is disposed within its respective opening in said retaining ring and which does not project from said retaining ring.

27. An apparatus as set forth in claim 23 wherein said inflatable restraint has an attachment portion which is wrapped around opposite sides of said retaining ring, each one of said screws extending through said attachment portion of said inflatable restraint on only one side of said retaining ring.

* * * * *